United States Patent
Lehle et al.

(10) Patent No.: US 8,229,620 B2
(45) Date of Patent: Jul. 24, 2012

(54) METHOD FOR MODEL-BASED DIAGNOSIS OF A MECHATRONIC SYSTEM

(75) Inventors: Walter Lehle, Leinfelden (DE); Jochen Assfalg, Stuttgart (DE); Martin Fritz, Tamm (DE); Frank Allgoewer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 708 days.

(21) Appl. No.: 11/920,610

(22) PCT Filed: May 15, 2006

(86) PCT No.: PCT/EP2006/062298
§ 371 (c)(1),
(2), (4) Date: Mar. 6, 2009

(87) PCT Pub. No.: WO2006/128788
PCT Pub. Date: Dec. 7, 2006

(65) Prior Publication Data
US 2009/0187303 A1    Jul. 23, 2009

(30) Foreign Application Priority Data
Jun. 3, 2005   (DE) .......................... 10 2005 025 520

(51) Int. Cl.
*G01D 9/00*   (2006.01)
*G06F 19/00*   (2006.01)

(52) U.S. Cl. ............. 701/31.8; 701/31.1; 701/31.7; 701/33.4

(58) Field of Classification Search .............. 701/29, 701/31, 33, 34, 35; 340/438, 445; 348/211.3
See application file for complete search history.

(56) References Cited

U.S. PATENT DOCUMENTS

| | | | |
|---|---|---|---|
| 4,517,468 A * | 5/1985 | Kemper et al. | 290/52 |
| 4,853,859 A * | 8/1989 | Morita et al. | 701/35 |
| 4,989,146 A | 1/1991 | Imajo et al. | |
| 5,041,976 A | 8/1991 | Marko et al. | |
| 5,491,631 A * | 2/1996 | Shirane et al. | 701/35 |
| 5,581,462 A * | 12/1996 | Rogers | 701/3 |
| 5,781,871 A | 7/1998 | Mezger et al. | |
| 6,014,598 A * | 1/2000 | Duyar et al. | 701/29 |
| 6,622,070 B1 * | 9/2003 | Wacker et al. | 701/29 |
| 6,654,910 B1 * | 11/2003 | Eibach et al. | 714/37 |
| 6,684,349 B2 * | 1/2004 | Gullo et al. | 714/47.2 |
| 6,972,669 B2 * | 12/2005 | Saito et al. | 340/438 |
| 7,283,946 B2 * | 10/2007 | Hiquchi et al. | 703/21 |
| 7,397,363 B2 * | 7/2008 | Joao | 340/539.11 |
| 7,562,049 B2 * | 7/2009 | Habaguchi | 705/40 |
| 2003/0109972 A1 * | 6/2003 | Tak | 701/29 |
| 2004/0024502 A1 * | 2/2004 | Squires et al. | 701/33 |
| 2007/0260373 A1 * | 11/2007 | Langer et al. | 701/29 |

FOREIGN PATENT DOCUMENTS

| | | | |
|---|---|---|---|
| DE | 44 45 903 | * | 7/1996 |
| DE | 103 333171 | | 2/2005 |
| JP | 61-89144 | | 5/1986 |
| JP | 8-145728 | | 6/1996 |
| JP | 2004-257955 | | 9/2004 |
| WO | WO 2004/074048 | | 9/2004 |
| WO | 2004/104604 | | 12/2004 |
| WO | WO 2004/104604 | * | 12/2004 |

* cited by examiner

Primary Examiner — Eric Culbreth
Assistant Examiner — George D. Spisich
(74) Attorney, Agent, or Firm — Kenyon & Kenyon LLP

(57) ABSTRACT

A method for model-based diagnosis of a mechatronic system. A control unit within the mechatronic system performs error detection and an arithmetic unit outside of the mechatronic system performs error identification.

7 Claims, 2 Drawing Sheets

METHOD FOR MODEL-BASED DIAGNOSIS OF A MECHATRONIC SYSTEM

FIELD OF THE INVENTION

The present invention relates to a method for model-based diagnosis of a mechatronic system, a diagnostic system, a computer program, and a computer program product.

BACKGROUND INFORMATION

Error diagnoses for managing complex mechatronic systems require model-based diagnostic procedures. Depending on whether a model-based diagnostic function or a model-based diagnostic algorithm is calculated on-board (on-line), i.e., within the system, or off-board (off-line), i.e., outside of the system, a differentiation is made between two basic diagnostic concepts, namely on-board error diagnosis and off-board error diagnosis.

In principle, only a traditional on-board error diagnosis is capable of ensuring an unambiguous error diagnosis based on complete informational content concerning a time behavior of a faulty system. However, this is not feasible in complex mechatronic systems due to stringent real-time requirements and the simultaneously marginally available computational power in present-day control units.

Off-board error diagnosis represents a compromise which does allow computational implementation of even complex diagnostic algorithms; however, in principle, it operates only with incomplete informational content of the time behavior of the faulty system. The achievable quality of off-board diagnosis therefore turns out to be generally lower than in the case of on-board error diagnosis. Sporadically occurring errors such as, for example, intermittent interruptions due to rain water in electrical plug contacts, freezing of movable mechanical elements, overheating due to unforeseen system load, etc., cannot be diagnosed reliably; in addition, off-board error diagnosis is unambiguous only in specific error cases.

German Patent Application No. DE 103 33 171 A1 describes a model-based diagnostic method for monitoring a subsystem of a machine. A quantitative model of the subsystem is used and an event-discrete analysis of the behavior of output signals is performed using qualitative values.

SUMMARY

In an example method of the present invention for model-based diagnosis of a mechatronic system, it is provided that a control unit within the mechatronic system performs error detection and an arithmetic unit outside of the mechatronic system performs error identification.

The example diagnostic system according to the present invention for model-based diagnosis of a mechatronic system has a control unit situated within the mechatronic system and an arithmetic unit situated outside of the mechatronic system. The control unit is designed for detection of errors occurring in the mechatronic system and the arithmetic unit is designed for identifying detected errors.

Thus, a comprehensive on-off-board concept is provided that combines the advantages of an on-board diagnosis and those of an off-board diagnosis. This makes a diagnosis possible which is based on complete informational content of the on-board diagnosis and which may be used for implementing an error diagnosis of complex mechatronic systems computationally.

A diagnostic task is divided into a not computation-intensive error detection subtask and a computation-intensive error identification subtask. In error detection, the control unit within the mechatronic system is used to determine if an error is present at a specific point in time $t_F$. In error identification, a powerful external arithmetic unit, for example a diagnostic tester, is used to unambiguously identify an error detected using a diagnostic function.

One example aspect of the present invention is that a specific sequence of temporarily stored data for input and output variables as well as time intervals may be permanently stored in a ring memory. A detection-controlled data transfer between the temporary and the permanent memories allows an intelligent selection of data containing information. In this manner, adequate information for diagnosis is available while the data volume to be stored is simultaneously limited.

By dividing the diagnostic tasks, it is possible to use advantages of both on-board diagnosis and off-board diagnosis.

The error detection to be performed on-board may thus take place under real operating conditions, taking into consideration sporadic errors that, for example, are not reproducible in a workshop. In addition, a development of an error over time may be observed, via which it is possible to obtain additional information concerning this error.

For the error identification to be performed off-board, the arithmetic unit outside of the mechatronic system has adequate computing power and storage space. In the case of error identification, no real-time requirements on the diagnostic function exist. The diagnostic function may be updated in a simple manner using updates to be implemented in the external arithmetic unit, thus making reprogramming of the control unit unnecessary.

The example computer program according to the present invention having program code is provided for carrying out all steps of the method according to the present invention, if the computer program is run on a computer or a corresponding arithmetic unit, in particular in the diagnostic system of the present invention.

The computer program product of the present invention having program code that are stored on a computer-readable data medium is provided for implementing all steps of the method of the present invention when the computer program is run on a computer or a corresponding computational diagnostic system, in particular in the diagnostic system of the present invention.

Additional advantages and embodiments of the invention may be found in the description and the accompanying figures.

Of course, the features stated above and the features still to be explained below are usable not only in the particular combination specified but also in other combinations or alone without departing from the framework of the present invention.

BRIEF DESCRIPTION OF THE DRAWINGS

The present invention is depicted schematically in the figures based on an exemplary embodiment and will be described in greater detail below.

DETAILED DESCRIPTION OF EXAMPLE EMBODIMENTS

Figure 1:
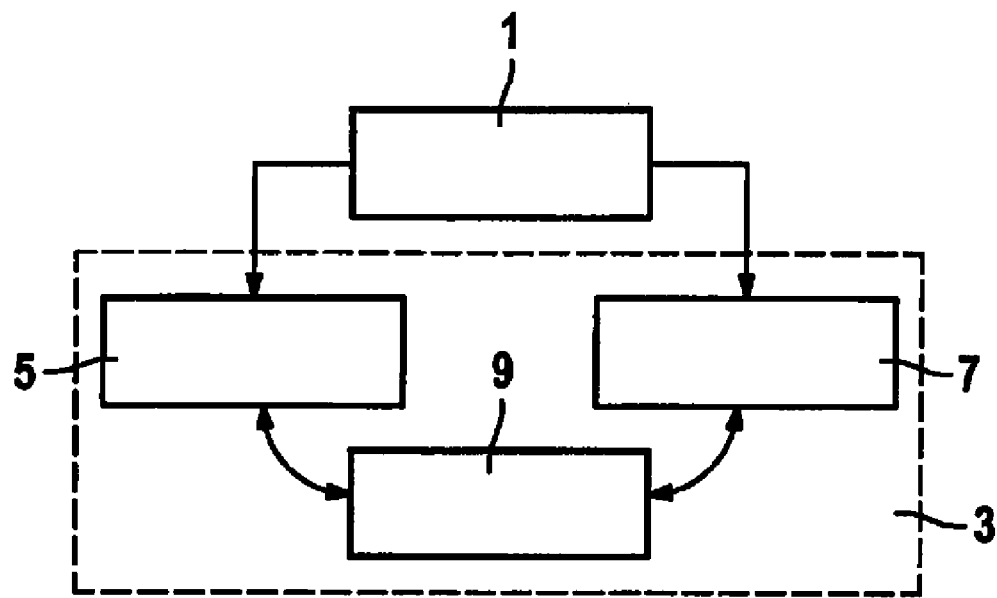
FIG. 1 shows a diagram for distributing diagnostic tasks.

The diagram in FIG. 1 illustrates how a task 1 of an error diagnosis 3 may be divided into an on-board error detection 5 and an off-board error detection 7. Data or signals of errors that occur within a mechatronic system and are detected by error detection 5 are stored using detection-controlled signal memory 9, which is implemented as a ring memory.

Figure 2:
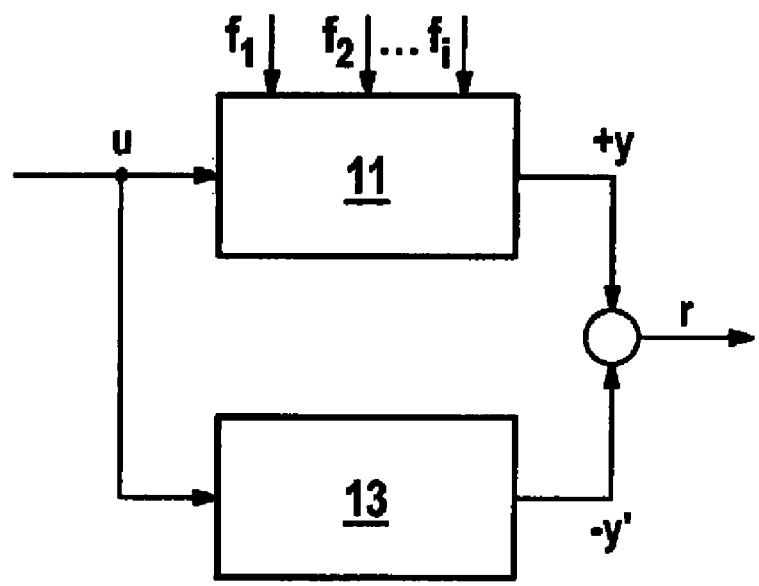
FIG. 2 shows a diagram for an error detection.

FIG. 2 shows how errors $f_1$, $f_2$, $f_i$ that may occur during the operation of a mechatronic system 11 may be detected. In this case, a diagnostic problem is reduced to a comparison of the real faulty system 11 with a detection model 13 of the error-free system. A behavior of system 11 and detection model 13 may be compared using measured actual values y for output variables and model-generated values y' for output variables; values for input variables are identified as u. Residues may be generated based either on a model or on signals. An error $f_1$, $f_2$, $f_i$ is detected if an absolute value of a residue r exceeds a maximum allowable detection threshold value $r_{max}$.

Since the effects of errors $f_1$, $f_2$, $f_i$ may not differ from one another in the error detection, a system characteristic of detectability is by far less stringent than a system characteristic of identifiability. If a model-based error detection is performed, for example, on the basis of a model, it may be sufficient if detection model 13 reflects only the essential relationships in an input and output behavior of system 11. The detection function may therefore be implemented using simplified detection models 13 of a low degree of detailing.

Figure 3:
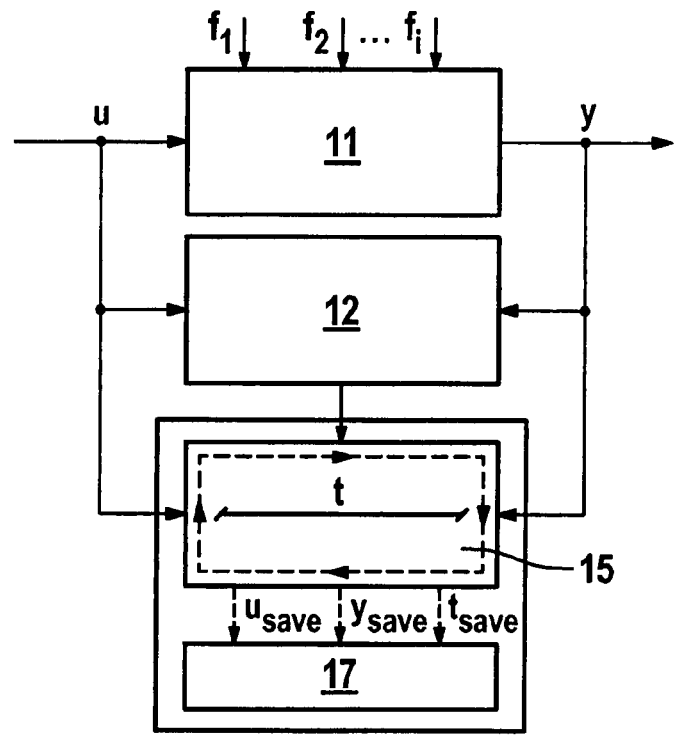
FIG. 3 shows a diagram for a detection-controlled storage of input and output signals.

FIG. 3 shows the detection-controlled storage of values u for the input signals at system inputs of system 11 or of actual values y for output signals at system outputs and of a corresponding time vector t. Values u, y of the signals contain complete information concerning a time behavior of faulty system 11. These values u, y may accordingly be stored on-board within system 11 and subsequently analyzed off-board, outside of the system.

Error detection takes place by comparing actual values y with, for example, model-generated setpoint values y' for the output variables. However, it is not absolutely necessary for the setpoint value to be generated from a model. The temporary signal memory is constantly active since it is implemented as a ring memory. As soon as an error occurs within the system and it is detected, data u, y of time period $t_1$ are immediately transferred to the permanent memory. Data u, y of time period $t_2$ are transferred to the permanent memory, preferably at the first possible point in time $t_L^{**}$.

The detection message is thus used for activating the transfer of data u, y of time period $t_3$ from the constantly active temporary signal memory (ring memory) to the permanent memory.

Values $u_{save}$, $y_{save}$, $t_{save}$ for input and output variables provided for the subsequent error identification as well as the time are permanently stored, detection-controlled, in a permanent memory 17.

Since storage media even having a very high storage capacity rapidly reach their limits under sufficiently fine signal scanning, it may not be possible to store values u, y of the signals over an entire operating time t of mechatronic system 11.

Figure 4:
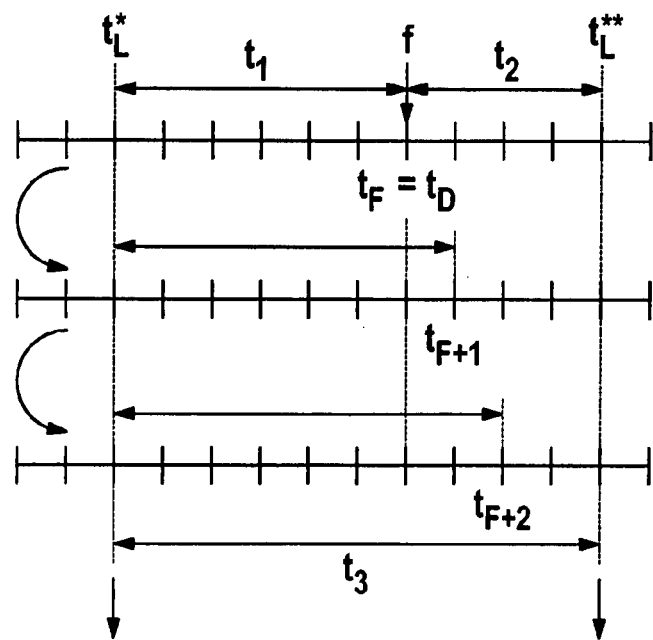
FIG. 4 shows a diagram for a chronological sequence of a memory process when an error occurs.

As shown in FIG. 4, only time segment $t_3$ that includes a direct point in time $t_F$ of an error occurrence is relevant to the present diagnostic concept. If this time segment $t_3$ is selected properly, it contains the complete information concerning the development of a corresponding error f over time. In the presence of a suitable synthesis of the function for error detection, a delay time between an actual error occurrence $t_F$ and a point in time of the detection of this error $t_D$ is negligibly small; $t_D \approx t_F$, the assumption accordingly being $t_D = t_F$. In the detection-controlled signal storage, it is provided to use a detection message at point in time $t_D$ as a control instruction of a memory process which determines values u, y of the signals in a relevant time segment $t_3$, which includes point in time of error occurrence $t_D$.

For the implementation, it is provided that one portion of the memory unit of the control unit within the mechatronic system operates from temporary signal memory 15 or an interim memory or buffer which operates according to the principle of the ring memory and another portion is formed from permanent memory 17. In this detection-controlled data transfer, a selection is made from information-containing values u, y or data from signals occurring within time segment $t_3$.

An overwriting process of the ring memory is temporally offset into the past in relation to $t_F$ at a present point in time $t_L^*$. This ensures that informational content in u, y concerning a preceding first time segment $t_1$ between $t_L^*$ and $t_F$ of a detected error f at point in time $t_D$ is not lost by overwriting.

Furthermore, values for signals u, y for an additional second time segment $t_2$ following $t_D$ are retained until a point in time $t_L^{**}$. A detection message causes temporarily stored values or data of signals u, y of information-containing time segment $t_3$, which includes the two first fixed segments $t_1$ and $t_2$ between points in time $t_{*L}$ and $t_{**L}$, to be written over from temporary memory 15 into permanent memory 17 and permanently retained there.

The data on individually documented errors $f_1$, $f_2$, $f_i$ retained in permanent memory 17 as part of the error detection may now be read out via a diagnostic interface so that the error identification may now take place outside of the system. The corresponding curves over time u and y as well as retained time vector t in connection with a model of faulty system behavior may provide all conditions necessary for a complete management of the diagnostic task.

The present diagnostic concept is suitable for an error diagnosis of complex mechatronic systems that are operated in large numbers of units. For reasons of cost, such systems are usually operated with relatively low-performance control units. Because a model-based error diagnosis presently does not constitute a conventional control unit functionality, generally only a slight portion of the available computational power and memory capacity is available for error diagnosis.

Potential applications of the diagnostic concept are error diagnosis of passenger cars/commercial vehicles as well as of their internal combustion engines (e.g., air system applications, applications in fuel injection systems, etc.), of mechatronic chassis systems (e.g., ABS, ESP, EHB, etc.), of mechatronic industrial and automation systems as well as of packaging or thermal industrial systems.

What is claimed is:

1. A method for model-based diagnosis of a mechatronic system, comprising:
   storing, in a temporary ring memory, values for at least one input variable of system inputs and actual values of at least one output variable of system outputs and a time vector;
   performing error detection via a control unit within the mechatronic system by comparing the actual values for the at least one output variable to a setpoint value;
   upon detection of an error, transferring from the temporary memory to a permanent memory values of the at least one input variable and values of the at least one output variable during a specified time segment which surrounds a direct point in time of the error occurrence; and
   performing error identification via an arithmetic unit outside of the mechatronic system using the values transferred to the permanent memory.

2. The method as recited in claim 1, further comprising:
combining error detection data and error identification data into a complete error diagnosis.

3. The method as recited in claim 1, wherein in the error detection, a setpoint value for the at least one output variable is subtracted from an actual value of the at least one output variable of the mechatronic system to form a residue, an error being detected if an absolute value of the residue exceeds a maximum allowable detection threshold value.

4. The method as recited in claim 1, wherein information-containing values of the at least one input variable and the at least one output variable during the specified time segment are selected.

5. The method as recited in claim 1, wherein for the error identification, data are read out of the permanent memory within the mechatronic system via a diagnostic interface and transferred to the arithmetic unit outside of the mechatronic system.

6. A diagnostic system for model-based diagnosis of a mechatronic system, comprising:
- a control unit situated within the mechatronic system; and
- an arithmetic unit situated outside of the mechatronic system;
- wherein the control unit is configured to perform error detection of errors occurring in the mechatronic system by performing:
  - storing, in a temporary ring memory, values for at least one input variable of system inputs and actual values of at least one output variable of system outputs and a time vector;
  - performing error detection by comparing the actual values for the at least one output variable to a setpoint value; and
  - upon detection of an error, transferring from the temporary memory to a permanent memory values of the at least one input variable and values of the at least one output variable during a specified time segment which surrounds a direct point in time of the error occurrence; and
- wherein the arithmetic unit is configured to perform error identification of detected errors using the values transferred to the permanent memory.

7. A non-transitory computer-readable data storage medium storing a computer program, the computer program, when executed by a computer, causing the computer to control a mechatronic system to perform the following steps:
- storing, in a temporary ring memory, values for at least one input variable of system inputs and actual values of at least one output variable of system outputs and a time vector;
- performing error detection via a control unit within the mechatronic system by comparing the actual values for the at least one output variable to a setpoint value;
- upon detection of an error, transferring from the temporary memory to a permanent memory values of the at least one input variable and values of the at least one output variable during a specified time segment which surrounds a direct point in time of the error occurrence; and
- performing error identification via an arithmetic unit outside of the mechatronic system using the values transferred to the permanent memory.

* * * * *